(12) United States Patent
Ohara et al.

(10) Patent No.: US 10,591,953 B2
(45) Date of Patent: Mar. 17, 2020

(54) SIGNAL PROCESSING APPARATUS AND METHOD

(71) Applicant: SONY SEMICONDUCTOR SOLUTIONS CORPORATION, Kanagawa (JP)

(72) Inventors: Sotaro Ohara, Tokyo (JP); Katsuyuki Tanaka, Kanagawa (JP); Katsumi Takaoka, Tokyo (JP); Keita Izumi, Kanagawa (JP); Suguru Houchi, Kanagawa (JP); Gaku Hidai, Kanagawa (JP); Yutaka Takagi, Kanagawa (JP); Hideki Takahashi, Kanagawa (JP); Hideki Awata, Gunma (JP); Yasushi Katayama, Kanagawa (JP); Naoki Yoshimochi, Kanagawa (JP); Toshimasa Shimizu, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 66 days.

(21) Appl. No.: 15/577,183

(22) PCT Filed: May 20, 2016

(86) PCT No.: PCT/JP2016/065025
§ 371 (c)(1),
(2) Date: Nov. 27, 2017

(87) PCT Pub. No.: WO2016/194655
PCT Pub. Date: Dec. 8, 2016

(65) Prior Publication Data
US 2018/0210487 A1     Jul. 26, 2018

(30) Foreign Application Priority Data

Jun. 5, 2015    (JP) ................................. 2015-114911

(51) Int. Cl.
    *G06F 1/12*            (2006.01)
    *G06G 7/00*          (2006.01)
    (Continued)

(52) U.S. Cl.
    CPC ................. *G06F 1/12* (2013.01); *G04G 3/00* (2013.01); *G04G 7/00* (2013.01); *G06F 1/14* (2013.01);
    (Continued)

(58) Field of Classification Search
    CPC ............................... G06F 1/3287; G06F 1/12; G06F 1/14; G04G 3/00; G04G 7/00
    (Continued)

(56) References Cited

U.S. PATENT DOCUMENTS 4,303,850 A * 12/1981 Juhasz .................... G04F 10/00
                                                          377/30
9,292,712 B2 * 3/2016 Stahl ..................... G06F 21/725
    (Continued)

FOREIGN PATENT DOCUMENTS

JP       2009-14393 A     1/2009
JP       2009-014393 A    1/2009
    (Continued)

OTHER PUBLICATIONS

International Search Report and Written Opinion of PCT Application No. PCT/JP2016/065025, dated Jun. 21, 2016, 06 pages of ISRWO.

*Primary Examiner* — Ji H Bae
(74) *Attorney, Agent, or Firm* — Chip Law Group

(57) ABSTRACT

The present disclosure relates to a signal processing apparatus and method that enables to reduce required power. In the signal processing apparatus, a RTC of a main chip and a RTC of a power supply chip are synchronized before power supply of the main chip is stopped, and the RTC of (Continued)

the main chip is synchronized with the time of the RTC of the power supply chip after the power supply of the main chip is restored. In this way, the RTC uses continuous time information before and after the stop. The present disclosure is capable of being applied to, for example, a GPS module in which a digital circuit includes a plurality of chips.

6 Claims, 9 Drawing Sheets

(51) Int. Cl.
- *G06F 1/14* (2006.01)
- *G04G 3/00* (2006.01)
- *G06F 1/3287* (2019.01)
- *G06F 1/3206* (2019.01)
- *G04G 7/00* (2006.01)

(52) U.S. Cl.
CPC .......... *G06F 1/3206* (2013.01); *G06F 1/3287* (2013.01)

(58) Field of Classification Search
USPC .......................................... 713/400, 503, 323
See application file for complete search history.

(56) References Cited

U.S. PATENT DOCUMENTS

| | | | |
|---|---|---|---|
| 2004/0205368 A1* | 10/2004 | Lange-Pearson | G06F 1/12 |
| | | | 713/400 |
| 2006/0294593 A1* | 12/2006 | Eldar | G06F 1/14 |
| | | | 726/26 |
| 2013/0262913 A1 | 10/2013 | Arai | |
| 2017/0185101 A1* | 6/2017 | Tai | G06F 1/14 |

FOREIGN PATENT DOCUMENTS

| | | |
|---|---|---|
| JP | 2013-205286 A | 10/2013 |
| JP | 5655419 B2 | 1/2015 |
| WO | 2012/120625 A1 | 9/2012 |

\* cited by examiner

SIGNAL PROCESSING APPARATUS AND METHOD

CROSS REFERENCE TO RELATED APPLICATIONS

This application is a U.S. National Phase of International Patent Application No. PCT/JP2016/065025 filed on May 20, 2016, which claims priority benefit of Japanese Patent Application No. JP 2015-114911 filed in the Japan Patent Office on Jun. 5, 2015. Each of the above-referenced applications is hereby incorporated herein by reference in its entirety.

TECHNICAL FIELD

The present disclosure relates to a signal processing apparatus and method, and more particularly, to a signal processing apparatus and method capable of synchronizing RTCs while a high resolution is maintained even in a case where the resolutions of the RTCs are different from each other.

BACKGROUND ART

In general, a real time clock (referred to as RTC below) has a power supply independent of a main function in a chip, and the RTC is used in a case where a main power supply is stopped to reduce power consumption and in a case where time information continuous to time information before the power supply is stopped is required after the power supply is restored (refer to Patent Document 1).

With progress in downsizing of digital circuits and reduction in power consumption due to miniaturization of a complementary metal oxide semiconductor (CMOS) process in recent years, a proportion of power consumed by a leak current in power consumed by the digital circuits has been increased in the miniaturization process. Therefore, demands to turn off an entire chip including the RTC (referred to as "deep sleep" below) have been increased.

CITATION LIST

Patent Document

Patent Document 1: Japanese Patent No. 5655419

SUMMARY OF THE INVENTION

Problems to be Solved by the Invention

However, when the power supply of the RTC is stopped, time information disappears. Therefore, the continuous time information cannot be used before and after the stop of the power supply.

Therefore, there is a method of synchronizing times of the RTCs.

However, if the resolutions of the RTCs are different from each other, for example, when a time of the RTC having a high resolution is synchronized with the RTC having a small resolution, time information for a resolution difference held by the RTC having a high resolution has been lost in the RTC having a low resolution. Furthermore, for example, even when the RTC having a high resolution is synchronized with the RTC having a low resolution and restores the time information after losing the time information due to the stop of the power supply and the like, it has been difficult to restore the lost information for the resolution difference.

The present disclosure has been made in view of such a situation. According to the present disclosure, even in a case where resolutions of RTCs are different from each other, the RTCs can be synchronized with each other while a high resolution is maintained.

Solutions to Problems

A signal processing apparatus according to one aspect of the present disclosure includes a first chip which includes a first real time clock (RTC) for holding a time by a count operation in response to a clock signal and controls an operation and a second chip which includes a second RTC different from the first RTC and controls power supply, and the first chip includes an operation controller which synchronizes the time of the first RTC with a time of the second RTC.

The operation controller can synchronize the time of the second RTC with the first RTC at the time when the power supply of the first chip is restored from the stop.

In a case where a resolution of the first RTC is higher than a resolution of the second RTC, the operation controller can make a memory hold time information that the first RTC can hold as information regarding a difference between the time of the first RTC and the time of the second RTC before the power supply of the first chip is stopped, and can make the memory use the time information when the power supply of the first chip is restored from the stop.

The operation controller can synchronize the time of the first RTC with the second RTC at the time of update of the time information of the first RTC.

In a signal processing method according to one aspect of the present disclosure, a signal processing apparatus including a first chip which includes the RTC for holding the time by a count operation in response to a clock signal and controls an operation and a second chip which includes a second RTC different from a first RTC and controls power supply synchronizes a time of the first RTC with a time of the second RTC.

According to one aspect of the present disclosure, the time of the first RTC included in the first chip which controls an operation is synchronized with the time of the second RTC which is different from that of the first RTC, and the second RTC is included in a second chip which controls power supply.

Effects of the Invention

According to the present technology, a plurality of RTCs can be synchronized with each other. In particular, even in a case where resolutions of the RTCs are different from each other, the RTCs can be synchronized with each other while the high resolution is maintained.

Note that the effects described herein are only exemplary, and the effects of the present technology are not limited to those described herein, and additional effects may be obtained.

MODE FOR CARRYING OUT THE INVENTION

Embodiments of the present disclosure are described below.

SUMMARY

In general, a real time clock (referred to as RTC below) has a power supply independent of a main function in a chip, and the RTC is used in a case where a main power supply is stopped to reduce power consumption and when time information continuous to time information before the power supply is stopped is required after the power supply is restored.

With progress in downsizing of digital circuits and reduction in power consumption due to miniaturization of a complementary metal oxide semiconductor (CMOS) process in recent years, a proportion of power consumed by a leak current in power consumed by the digital circuits has been increased in the miniaturization process. Therefore, demands to turn off an entire chip including the RTC (referred to as "deep sleep" below) have been increased. However, when the power supply of the RTC is stopped, time information disappears. Therefore, the continuous time information cannot be used before and after the stop of the power supply.

Figure 1:
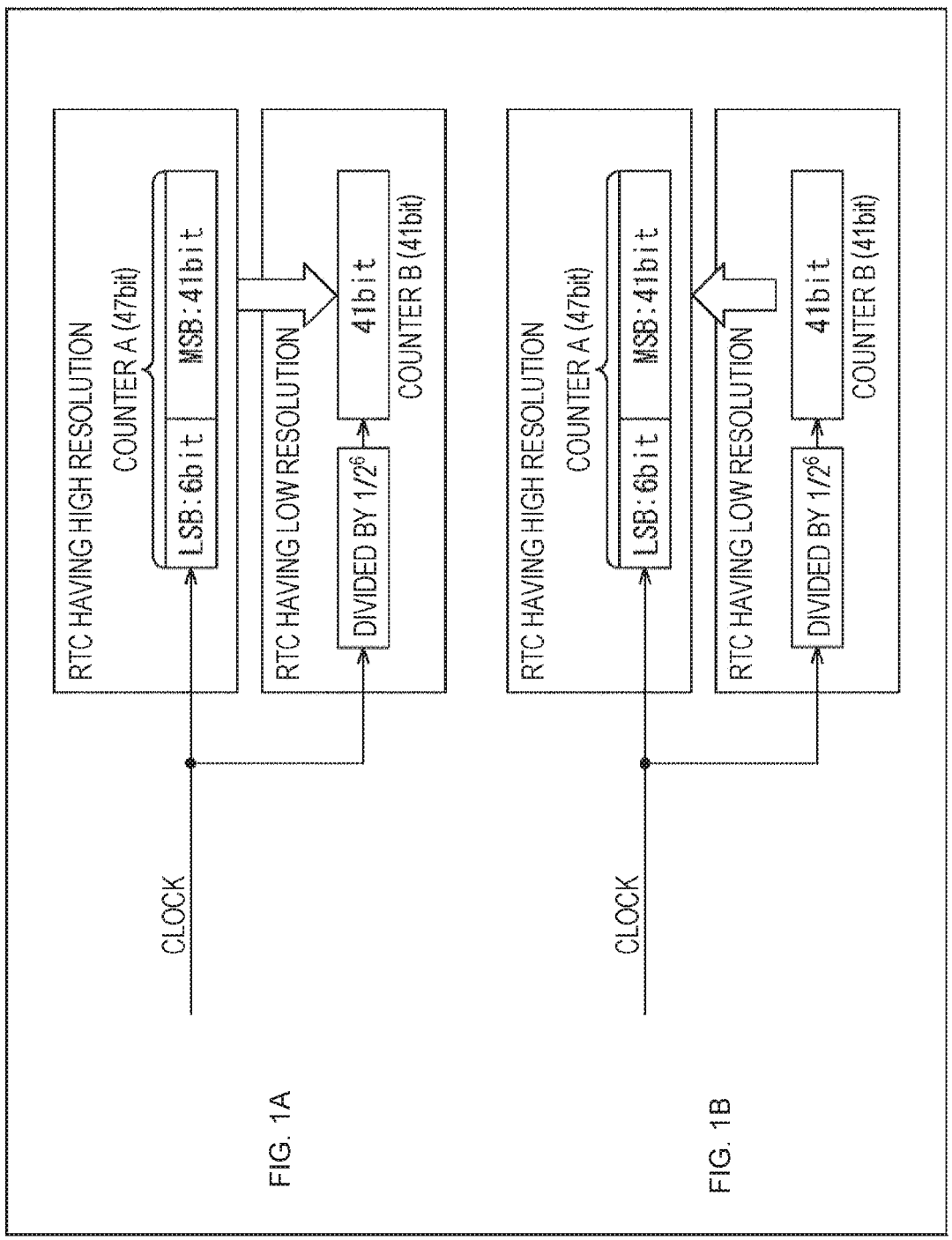
FIGS. 1A and 1B are diagrams to describe a difference between resolutions of RTCs.

In a case where time synchronization between multiple RTCs is performed, there is a difference between the resolutions of the RTCs. Therefore, ingenuity is needed. The difference between the resolutions of the RTCs will be described with reference to FIGS. 1A and 1B. As illustrated in FIG. 1A, when a time of a RTC having a high resolution is synchronized with that of a RTC having a low resolution, time information of a resolution difference held by the RTC having the high resolution is lost in the RTC having the low resolution. For example, in a case of FIG. 1A, if a time of a 47-bit counter A is synchronized with a time of a 41-bit counter B, the information of LSB: 6 bits of the counter A is discarded.

Note that since the same clocks are used, an example in which a clock input to the RTC with the low resolution is divided by $1/2^6$ in the RTC and input to the counter is illustrated in FIG. 1A. The place where the clock is divided may be anywhere in the chip before the clock is input to the counter. Regarding the frequency division, the same applies to the embodiments of the present disclosure.

Furthermore, for example, as illustrated in FIG. 1B, even when the RTC having a high resolution is synchronized with the RTC (counter B) having a low resolution and the time information is restored after the RTC having a high resolution lost the time information by the stop of the power supply and the like, the lost information for the resolution difference (LSB: 6 bits) of the counter A cannot be restored.

Figure 2:
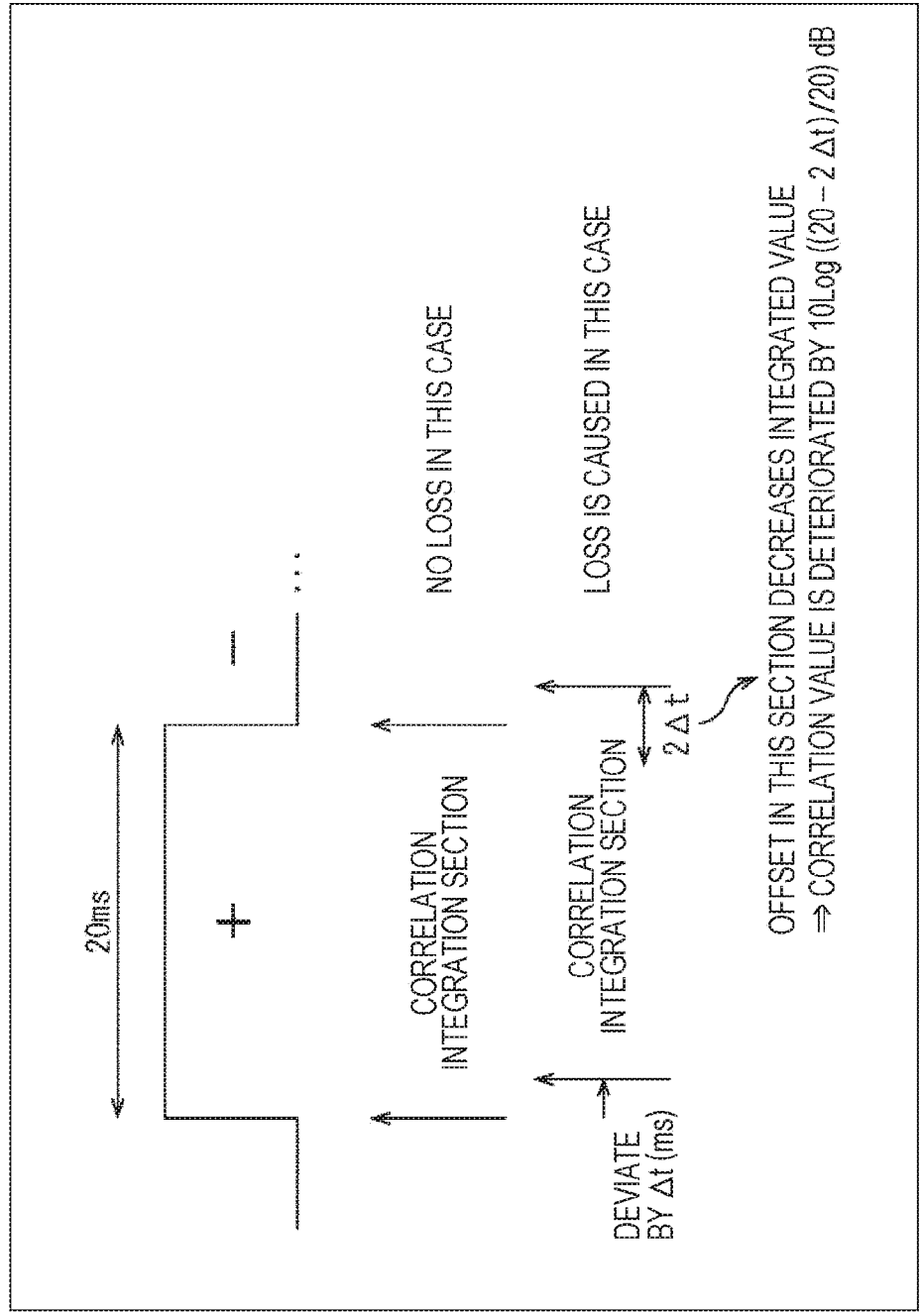
FIG. 2 is a diagram to describe time information regarding a bit boundary.

For example, in a GPS receiver, ephemeris and almanac can be used. In a case where hot start using them is performed, the time information regarding the bit boundary of 50-bps data from each satellite from which the data is received is used, and correlation integration is performed in the same data section of 20 ms. As illustrated in FIG. 2, if the time information regarding the bit boundary deviates by $\Delta t$ (ms), an added value of two $\Delta t$ is offset, and an integrated value is decreased. As a result, sensitivity is deteriorated. At this time, the correlation value is deteriorated by $10 \log((20-2\Delta t)/20)$ dB. Therefore, the RTC having a sufficiently high resolution is required.

After the GPS receiver enters the state of the deep sleep, the external RTC and the RTC in the GPS receiver are synchronized with each other, and the time information of the RTC in the GPS receiver is restored. In this case, the time information regarding the bit boundary is shifted by a resolution difference and the gap deteriorates the sensitivity when the resolution of the external RTC is lower than that of the RTC in the GPS receiver.

For example, in a case of $\Delta t = \pm 0.5$ ms, the sensitivity deterioration of 0.22 dB occurs. For example, in a case of $\Delta t = \pm 1$ ms, the sensitivity deterioration of 0.46 dB occurs.

Therefore, in the present technology, in a system including a plurality of chips, including a main chip of the advanced process and a power supply chip of the legacy process, each chip has an independent RTC, and the RTCs are synchronized with each other.

As a result, it is possible to stop the power supply to the entire main chip and to enable an operation with low power consumption. Furthermore, highly accurate time information can be shared among the RTCs. In addition, the times of the RTCs having different resolutions can be synchronized with high accuracy.

[Signal Processing Apparatus According to the Present Technology]

Figure 3:
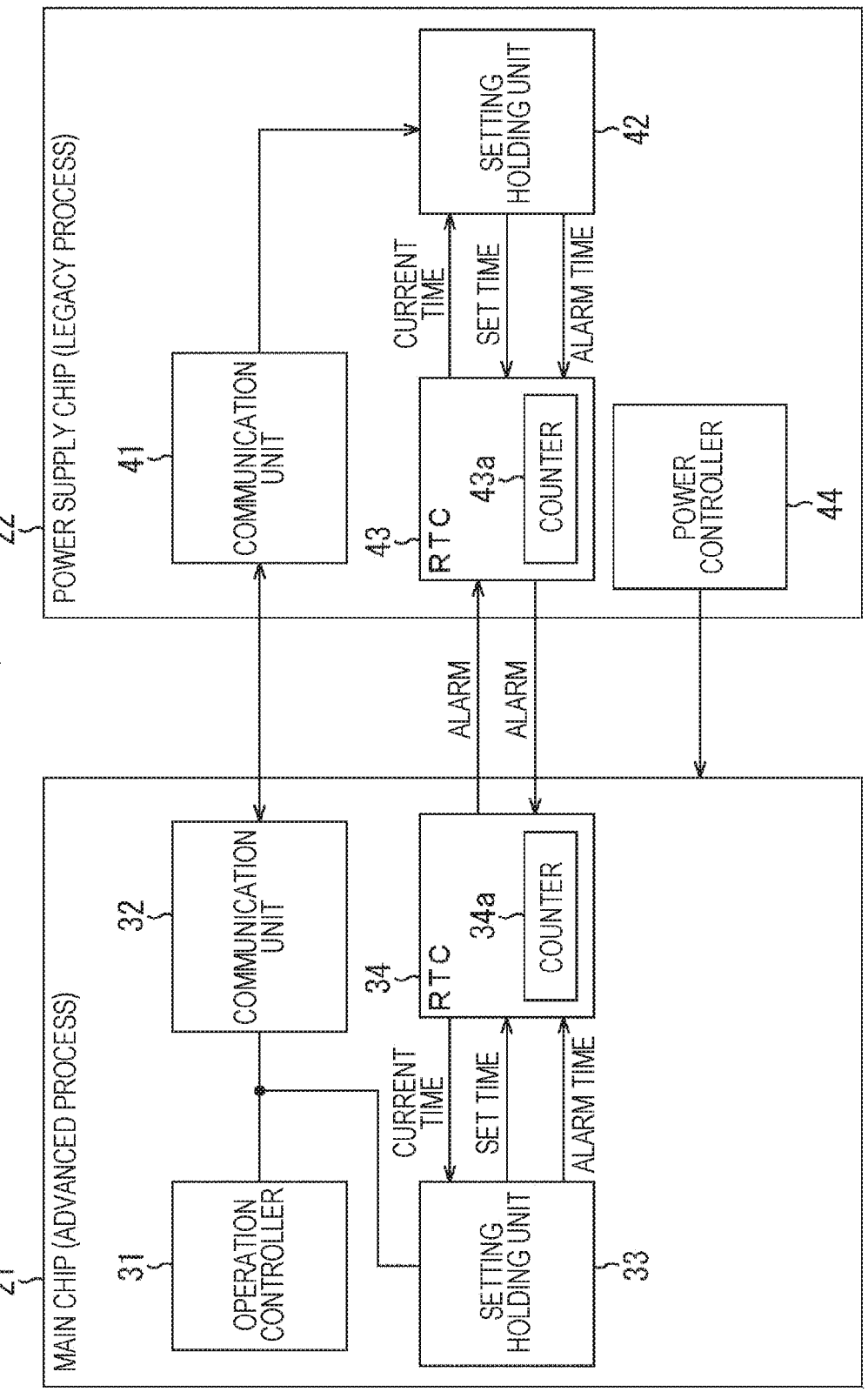
FIG. 3 is a block diagram of an exemplary configuration of a signal processing apparatus to which the present technology has been applied.

FIG. 3 is a block diagram of an exemplary configuration of a signal processing apparatus to which the present technology has been applied.

A signal processing apparatus 11 includes a main chip 21 of the advanced process and a power supply chip 22 of the legacy process.

The main chip 21 includes an operation controller 31, a communication unit 32, a setting holding unit 33, and an RTC 34 having a counter. The power supply chip 22 includes a communication unit 41, a setting holding unit 42, an RTC 43 having a counter 43a, and a power controller 44.

The operation controller 31 controls an operation of each unit of the signal processing apparatus 11. That is, the operation controller 31 controls operations of each unit of the main chip 21 and each unit of the power supply chip 22. The communication unit 32 communicates with the communication unit 32 of the power supply chip 22 under the control of the operation controller 31. The setting holding unit 33 holds time information (set time and alarm time) under the control of the operation controller 31. The RTC 34 holds the time by a count operation of the counter 34a in response to an RTC clock signal from outside under the control of the operation controller 31.

The communication unit 41 communicates with the communication unit 41 of the main chip 21 under the control of the operation controller 31. The setting holding unit 42 holds time information (set time and alarm time) under the control of the operation controller 31. The RTC 43 holds the time by a count operation of the counter 43a in response to an RTC clock signal from outside under the control of the operation controller 31. The power controller 44 controls the power supply to the main chip 21 under the control of the operation controller 31.

In a case where the power supply of the main chip 21 is stopped to reduce power consumption, a counter value of the RTC 34 is cleared. Therefore, it is difficult for the RTC 34 to hold continuous times before and after the stop. Therefore, in the signal processing apparatus 11, the RTC 34 of the main chip 21 and the RTC 43 of the power supply chip 22 are synchronized with each other before the power supply of the main chip 21 is stopped, and the RTC 34 of the main chip 21 and the RTC 43 of the power supply chip 22 are synchronized with each other again after the power supply of the main chip 21 is restored. In this way, the RTC 34 can use the continuous time information before and after the stop.

In addition, in recent years, due to miniaturization of the CMOS process, a proportion of the power consumed by the leakage current has been increased. However, according to the present technology, since the power supply of the main chip 21 can be completely stopped including the power supply of the RTC 34, the power consumption can be reduced.

[Example of Synchronization Processing]

Next, synchronization processing as signal processing of the signal processing apparatus 11 is described with reference to the flowchart in FIG. 4 and FIG. 5.

In step S11, the main chip 21 reads the current time of the RTC 43 of the power supply chip 22. That is, as indicated by an arrow A11 in FIG. 5, the RTC 43 reads the current time held by the counter 43a under the control of the operation controller 31 and supplies the read current time to the operation controller 31 via the setting holding unit 42, the communication unit 41, and the communication unit 32.

In step S12, the main chip 21 notifies the power supply chip 22 of a future time from the read current time of the counter 43a, and causes the setting holding unit 33 to hold the set time. The setting holding unit 33 holds the future time as the set time. As indicated by an arrow A12 in FIG. 5, the RTC 43 of the power supply chip 22 receives the future time from the main chip 21 via the communication unit 41 and the setting holding unit 42 and supplies the future time to the counter 43a of the RTC 43 as an alarm time.

In step S13, the RTC 43 of the power supply chip 22 compares the alarm time with the current time of the counter 43a and waits until it is determined that the alarm time has come. In step S13, in a case where it is determined that the alarm time has come, the processing proceeds to step S14.

Figure 5:
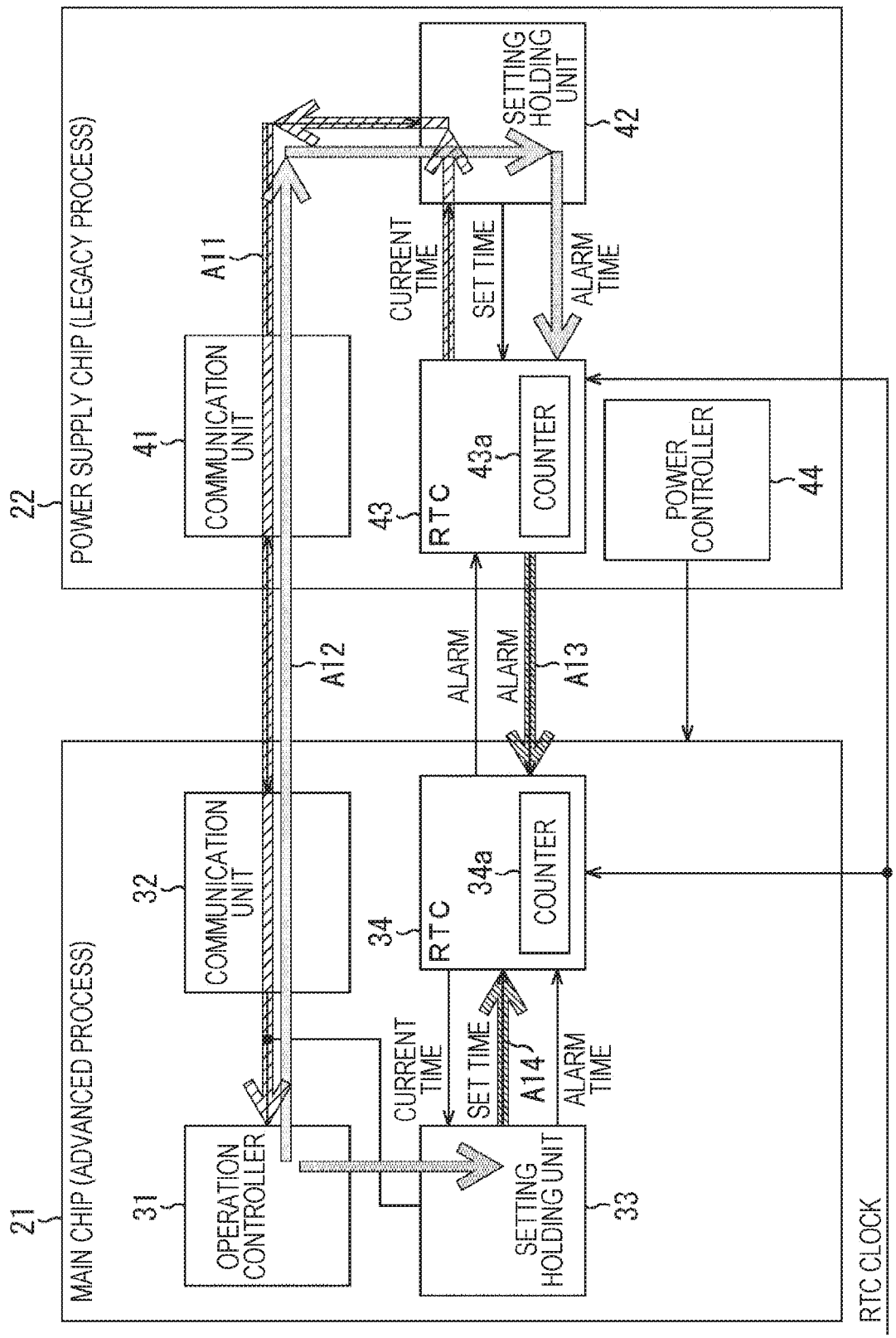
FIG. 5 is a diagram to describe the synchronization processing of the signal processing apparatus.

In step S14, the RTC 43 of the power supply chip 22 issues an alarm to the RTC 34 as indicated by the arrow A12 in FIG. 5.

In step S15, as indicated by an arrow A13 in FIG. 5, when receiving the alarm, the RTC 34 starts the counter 34a of the RTC 34 from the set time held by the setting holding unit 33.

As described above, the time of the RTC 43 of the power supply chip 22 can be synchronized with the RTC 34 of the main chip 21.

As a result, it is possible to stop the power supply to the entire main chip and to enable an operation with low power consumption.

Figure 6:
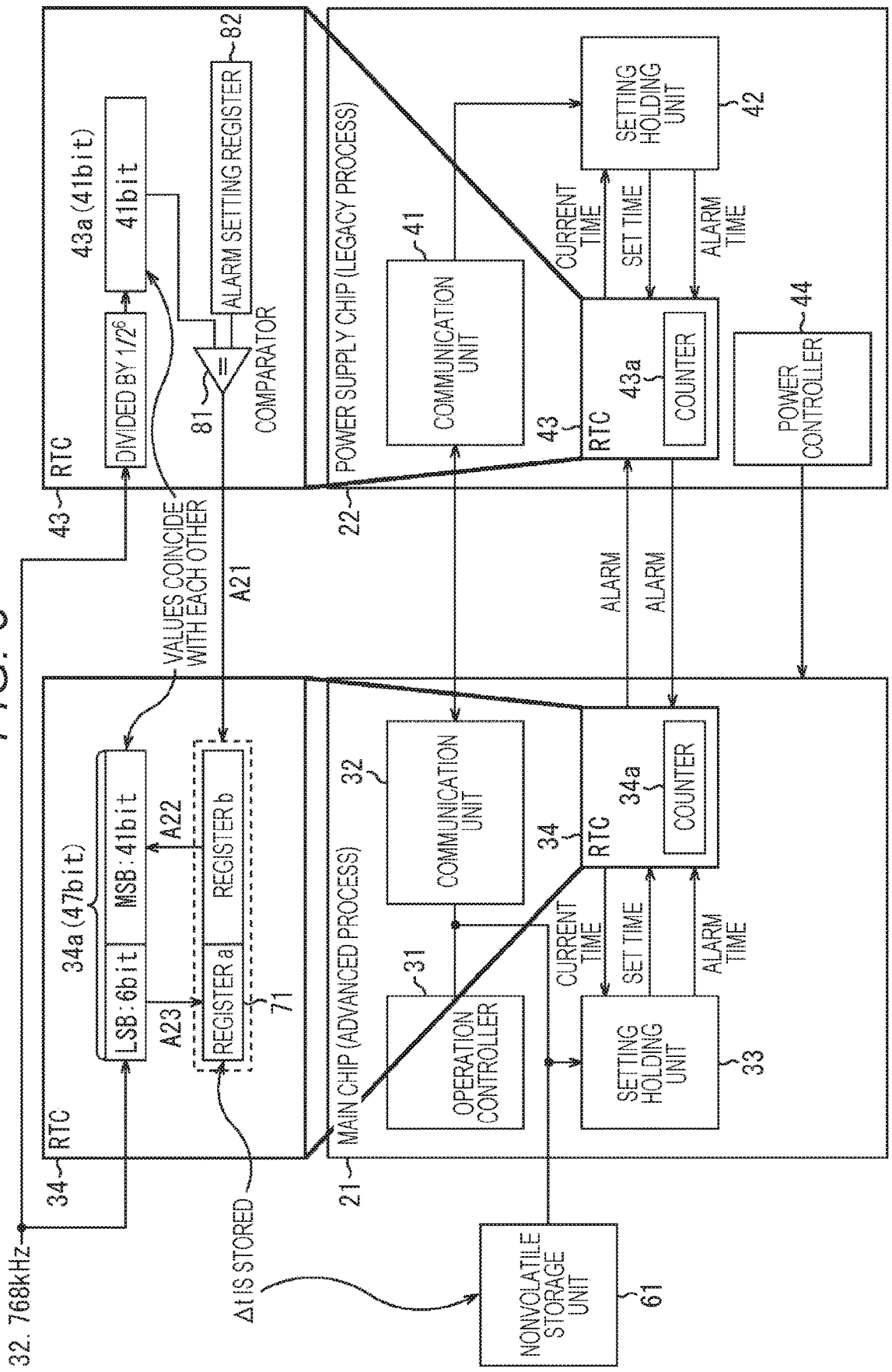
FIG. 6 is a diagram to describe information storage.

Furthermore, according to the functions of the main chip 21, the RTC 34 may require a high resolution. Even in a case where the resolution of the RTC 34 of the main chip 21 is higher than the resolution of the RTC 43 of the power supply chip 22, to maintain the resolution of the main chip and to synchronize the time of the RTC of the power supply chip with the RTC of the main chip, the main chip 21 includes a nonvolatile storage unit 61 illustrated in FIG. 6 and synchronizes the main chip 21 and the power supply chip 22 as follows in a state where both chips are turned on. Furthermore, in the example of FIG. 6, a register 71 is provided in the RTC 34, and a comparator 81 and an alarm setting register 82 are provided in the RTC 43. However, in practice, the register 71 is generally provided in the setting holding unit 33, and the alarm setting register 82 is generally provided in the setting holding unit 42.

Figure 4:
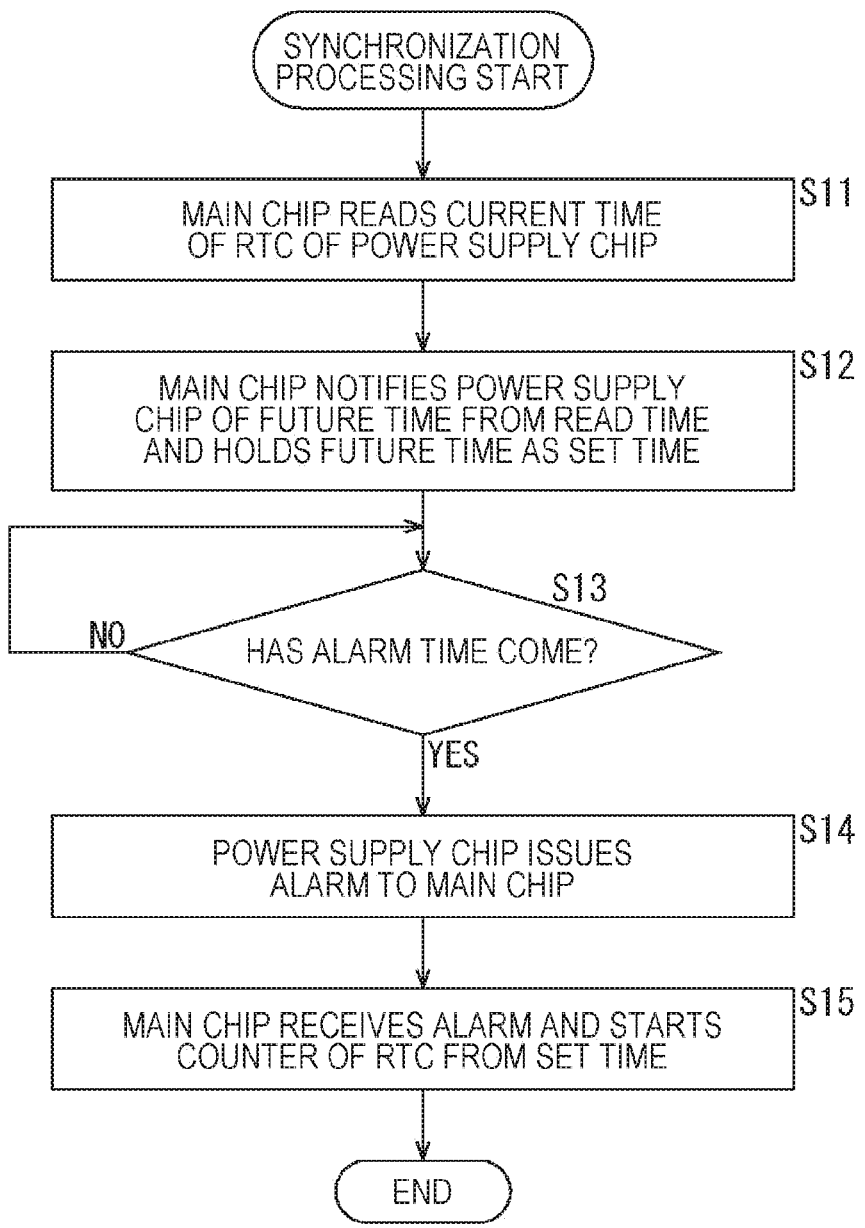
FIG. 4 is a flowchart to describe synchronization processing of the signal processing apparatus.

That is, in a state where both are turned on and synchronized with each other, similarly to the processing in step S11 in FIG. 4, the main chip 21 reads the current time of the RTC 43 of the power supply chip 22, and similarly to the processing in step S12, the main chip 21 notifies the power supply chip 22 of the future time from the read current time of the counter 43a and causes the setting holding unit 33 to hold the future time as the set time. At this time, the setting holding unit 33 stores the set time in a register b of the register 71.

Next, similarly to the processing in steps S13 and S14, the main chip 21 notifies the RTC 43 of the power supply chip 22 of the comparison result of the times. According to the comparison by the comparator 81, when the alarm time held in the setting holding unit 42 (actually, set by alarm setting register 82) coincides with the current time counted by the counter 43a of the RTC 43, the RTC 43 issues an alarm to the RTC 34 as indicated by an arrow A21.

The RTC 34 receives the alarm. Correspondingly, the main chip 21 loads the set time stored in the register b of the register 71 into an MSB of the counter as indicated by an arrow A22. Furthermore, at this time, the main chip 21 holds the count value (LSB: 6 bits) of the resolution, which is not provided for the counter 34a of the RTC 34 of the power supply chip 22, in the register b of the register 71 and the nonvolatile storage unit 61 as indicated by an arrow A23.

In this way, when being turned on, the main chip 21 and the power supply chip 22 are synchronized with each other.

Then, as in the synchronization processing in the flowchart of FIG. 4, when the time of the RTC 43 of the power supply chip 22 is synchronized with the time of the RTC 34 of the main chip 21 in practice, the synchronization can be performed while the high resolution of the RTC 34 of the main chip 21 is maintained by making the LSB of the counter 34a of the RTC 34 of the main chip 21 hold the value held by the register b (nonvolatile storage unit 61) of the register 71.

[Another Example of Synchronization Processing]

Figure 7:
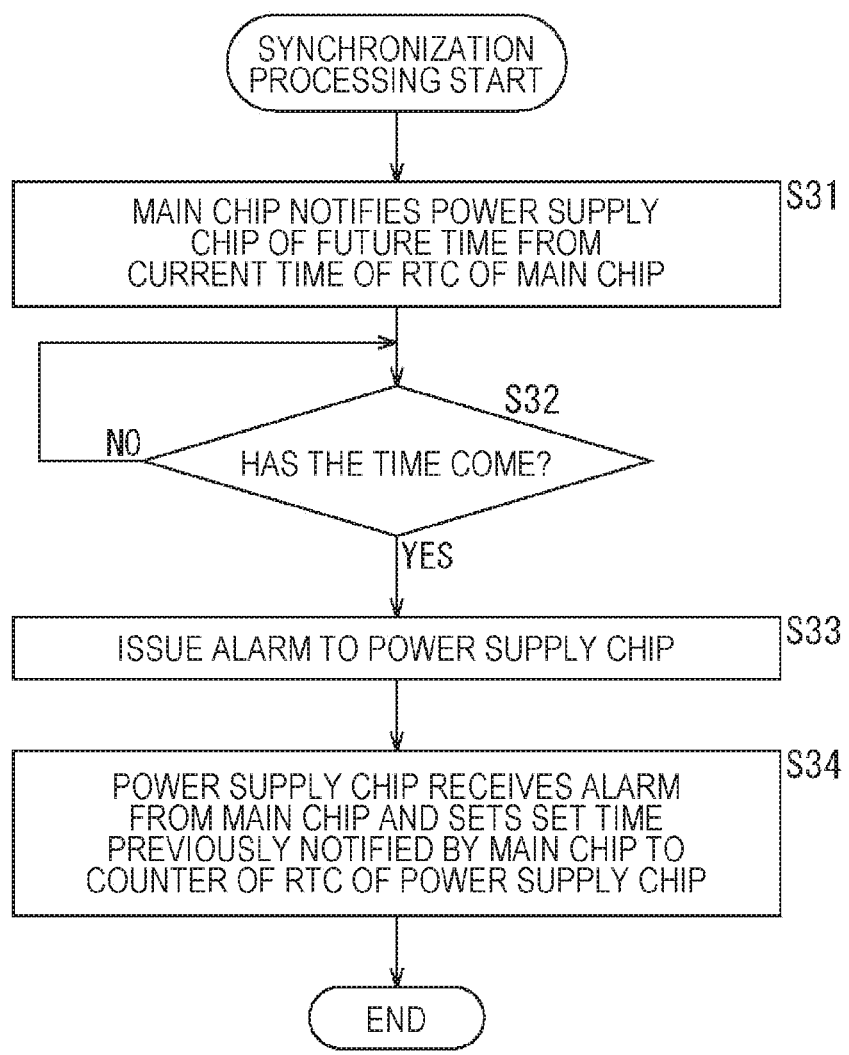
FIG. 7 is a flowchart to describe another example of the synchronization processing of the signal processing apparatus.
Figure 8:
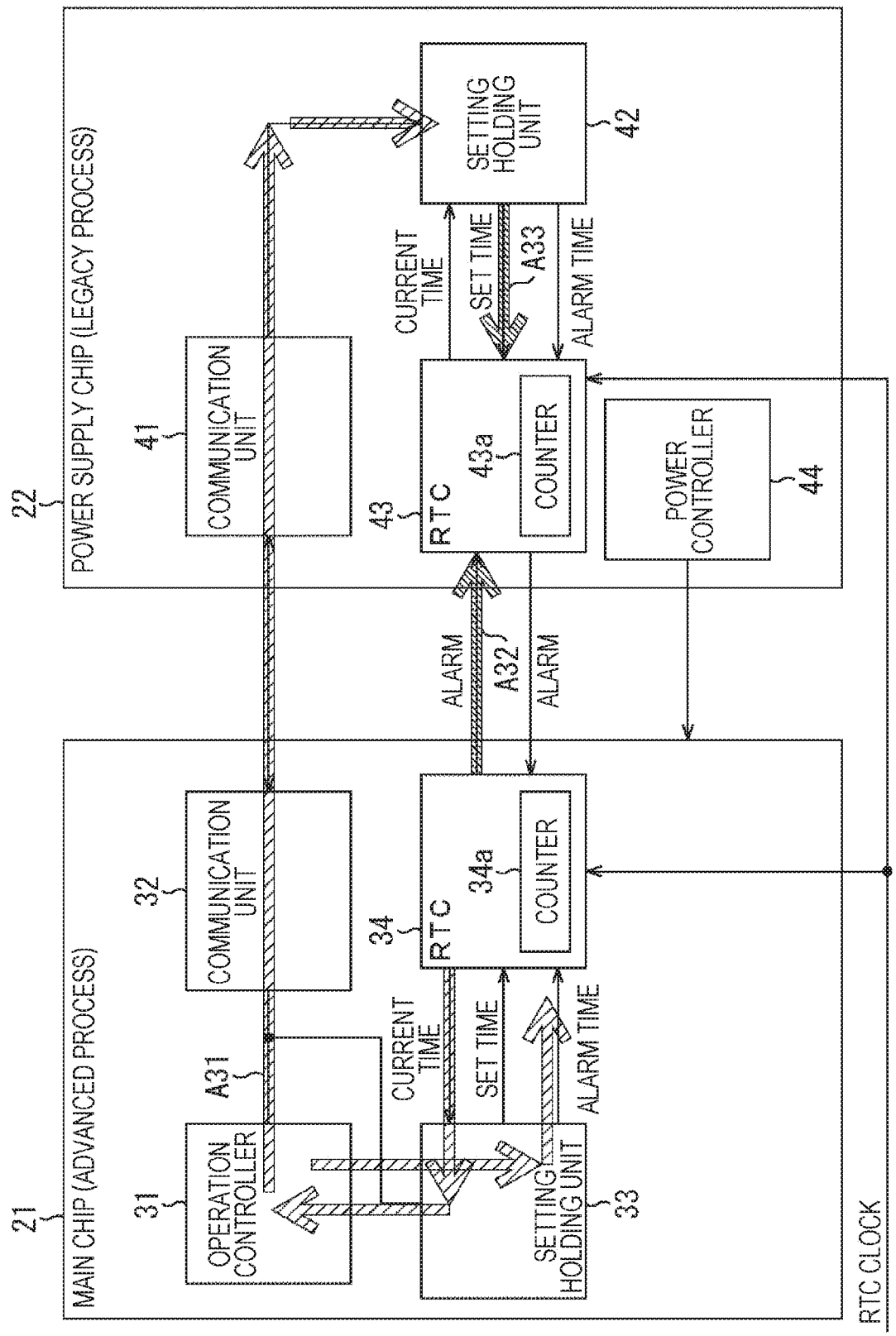
FIG. 8 is a diagram to describe still another example of the synchronization processing of the signal processing apparatus.

Next, another example of synchronization processing as the signal processing of the signal processing apparatus 11 is described with reference to the flowchart in FIG. 7 and FIG. 8. For example, a case is described in which the GPS receiver has a function of the main chip 21 to obtain the time information with high accuracy, the time information of the RTC 34 is updated, and the RTC 43 is synchronized with the time information.

In step S31, the main chip 21 notifies the power supply chip 22 of the future time from the current time of the RTC 34 of the main chip 21. That is, as indicated by an arrow A31, the RTC 34 of the main chip 21 supplies the current time counted by the counter 34a to the operation controller 31 via the setting holding unit 33 under the control of the operation controller 31. Correspondingly, the operation controller 31 notifies the setting holding unit 42 of the future time from the current time of the RTC 34 via the communication unit 32 and the communication unit 41 of the power supply chip 22. The setting holding unit 42 holds the future time as the set time. At this time, the operation controller 31 notifies the RTC 34 of this future time as the alarm time via the setting holding unit 33.

In step S32, the RTC 34 compares the alarm time with the current time of the counter 34a and waits until it is determined that the time (alarm time) has come. In step S32, in a case where it is determined that the time has come, the processing proceeds to step S33.

In step S33, the RTC 34 issues an alarm to the RTC 43 of the power supply chip 22 as indicated by an arrow A32.

In step S34, the power supply chip 22 receives the alarm from the main chip 21 and sets the set time (future time), which has been previously notified from the main chip 21, to the counter 43a of the RTC 43 of the power supply chip 22. That is, as indicated by an arrow A33, the setting holding unit 42 supplies the held setting time to the RTC 43. The RTC 43 sets the set time to the counter 43a.

As described above, the time of the RTC 34 of the main chip 21 can be synchronized with the RTC 43 of the power supply chip 22.

As described above, according to the present technology, in the apparatus (system) including the plurality of chips, the times of the RTCs of the respective chips can be bidirectionally synchronized. Furthermore, in a case where the resolutions of the RTCs are different from each other, the RTCs can be synchronized with each other while the high resolution is maintained.

Therefore, it is possible to stop the power supply to the entire main chip and to enable an operation with low power consumption.

Furthermore, in the above description, an example with two chips has been described. However, the number of chips may be three or more as long as the number is plural.

Furthermore, in the above description, the signal processing apparatus has been described as an example. However, the present technology can be applied to the following GPS module.

[GPS Module to Which the Present Invention is Applied]

Figure 9:
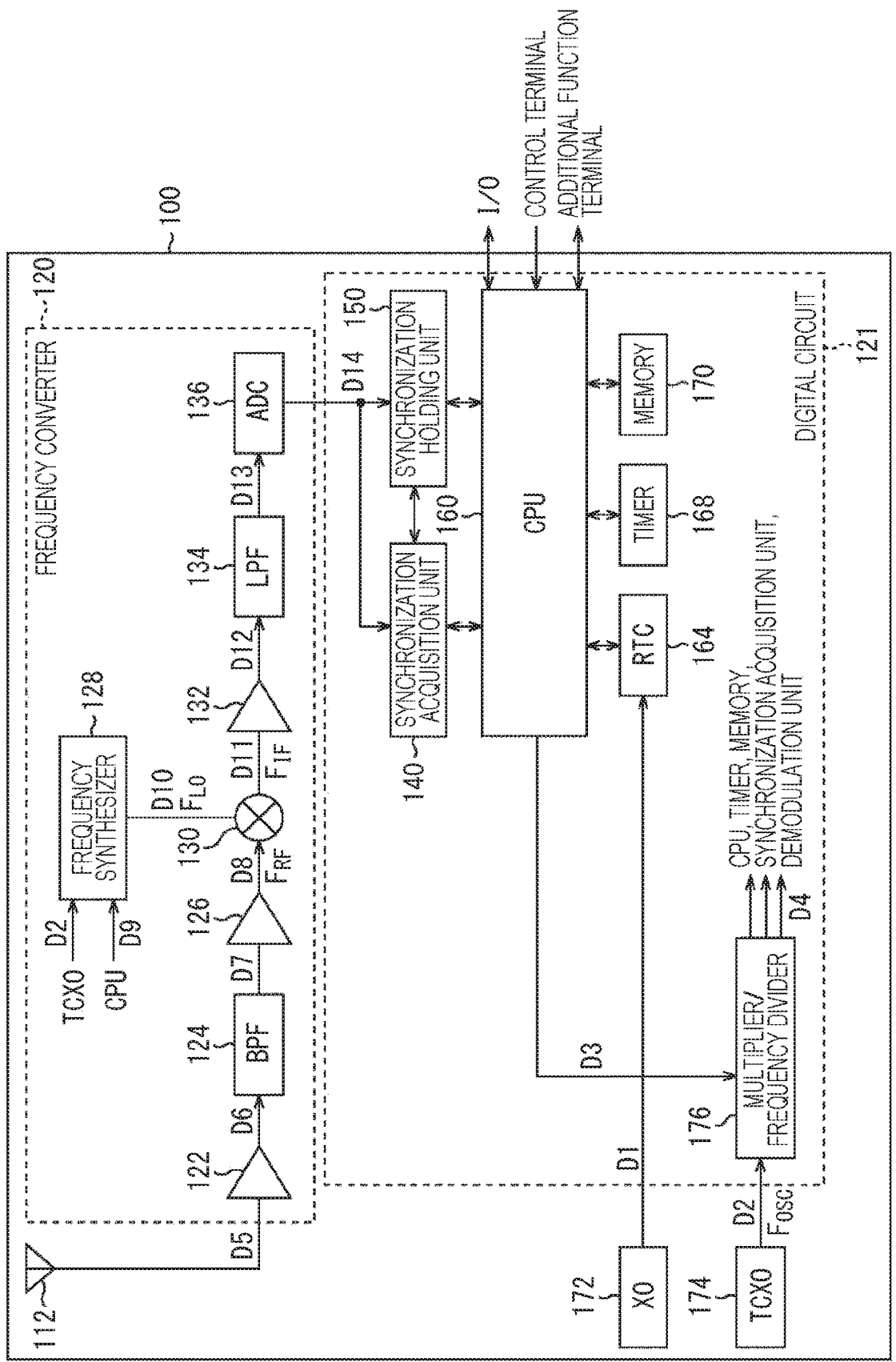
FIG. 9 is a block diagram of an exemplary configuration of a global positioning system (GPS) module to which the present technology has been applied.

FIG. 9 is a block diagram of an exemplary configuration of a GPS module to which the present technology has been applied.

In the example in FIG. 9, a GPS module 100 includes an antenna 112, a frequency converter 120, a synchronization acquisition unit 140, a synchronization holding unit 150, a central processing unit (CPU) 160, a real time clock (RTC) 164, a timer 168, a memory 170, a crystal oscillator (x'tal oscillator, XO) 172, a temperature compensated x'tal oscillator (TCXO) 174, and a multiplier/frequency divider 176.

The XO 172 oscillates a signal D1 having a predetermined frequency (for example, about 32.768 kHz) and supplies the oscillated signal D1 to the RTC 164. The TCXO 174 oscillates a signal D2 having a frequency (for example, about 16.368 MHz) different from that of the XO 172 and supplies the oscillated signal D2 to the multiplier/frequency divider 76 and a frequency synthesizer 128.

The multiplier/frequency divider 176 multiplies/divides the signal D2 supplied from the TCXO 174 on the basis of an instruction from the CPU 160. Then, the multiplier/frequency divider 176 supplies a signal D4, which has been multiplied/divided, to the frequency synthesizer 128 of the frequency converter 120, an ADC 136, the CPU 160, the timer 168, the memory 170, the synchronization acquisition unit 140, and the synchronization holding unit 150.

The antenna 112 receives a radio signal (for example, RF signal in which carrier of 1575.42 MHz is diffused) including a navigation message or the like transmitted from a GPS satellite that is a satellite of the global positioning system. Then, the antenna 112 converts the radio signal into an electric signal D5 and supplies the electric signal D5 to the frequency converter 120.

The frequency converter 120 includes a low noise amplifier (LNA) 122, a band pass filter (BPF) 124, an amplifier 126, a frequency synthesizer 128, a multiplier 130, an amplifier 132, a low pass filter (LPF) 134, and an analog digital converter (ADC) 136. As will be described below, the frequency converter 120 down-converts the signal D5 having a high frequency of 1575.42 MHz received by the antenna 112 into a signal D14 having a frequency of about 1.023 MHz for easy digital signal processing.

The LNA 122 amplifies the signal D5 supplied from the antenna 112 and supplies the amplified signal to the BPF 124. The BPF 124 is constituted by a surface acoustic wave filter (SAW filter). The BPF 124 extracts a specific frequency component from among frequency components of a signal D6 amplified by the LNA 122, and supplies the extracted frequency component to the amplifier 126. The amplifier 126 amplifies a signal D7 (frequency FRF) having the frequency component extracted by the BPF 124, and supplies the signal to the multiplier 130.

The frequency synthesizer 128 uses the signal D2 supplied from the TCXO 174 to generate a signal D10 having a frequency FLO on the basis of an instruction D9 from the CPU 160. Then, the frequency synthesizer 128 supplies the signal D10 having the generated frequency FLO to the multiplier 130.

The multiplier 130 multiplies a signal D8 having the frequency FRF supplied from the amplifier 126 by the signal D10 having the frequency FLO supplied from the frequency synthesizer 128. That is, the multiplier 130 down-converts a high frequency signal into an intermediate frequency (IF) signal D11 (for example, intermediate frequency signal having frequency of about 1.023 MHz).

The amplifier 132 amplifies the IF signal D11 down-converted by the multiplier 130 and supplies the amplified signal to the LPF 134.

The LPF 134 extracts a low frequency component in the frequency components of the IF signal D12 amplified by the amplifier 130, and supplies a signal D13 having the extracted low frequency component to the ADC 136. Furthermore, in FIG. 9, an example is described in which the LPF 134 is disposed between the amplifier 132 and the ADC 136. However, a BPF may be disposed between the amplifier 132 and the ADC 136.

The ADC 136 samples the IF signal D13 in an analog format supplied from the LPF 134 to convert the IF signal D13 into the signal in a digital format and supplies the IF signal D14 converted into the digital format to the synchronization acquisition unit 140 and the synchronization holding unit 150 bit by bit.

On the basis of the control by the CPU 160, the synchronization acquisition unit 140 uses the signal D3 supplied from the multiplier/frequency divider 176 to perform synchronization acquisition with the pseudo-random noise (PRN) code of the IF signal D14 supplied from the ADC 136. Furthermore, the synchronization acquisition unit 140 detects a carrier frequency of the IF signal D14. Then, the synchronization acquisition unit 140 supplies a phase of the PRN code, the carrier frequency of the IF signal D14, and the like to the synchronization holding unit 150 and the CPU 160.

On the basis of the control by the CPU 160, the synchronization holding unit 150 holds the synchronization of the carrier with the PRN code of the IF signal D14 supplied from the ADC 136 by using the signal D3 supplied from the multiplier/frequency divider 176. More specifically, the synchronization holding unit 150 operates as using the phase of the PRN code and the carrier frequency of the IF signal D14 supplied from the synchronization acquisition unit 140 as initial values. Then, the synchronization holding unit 150 demodulates the navigation message included in the IF signal D14 supplied from the ADC 136, and supplies the demodulated navigation message, the phase of the PRN code and the carrier frequency with high accuracy to the CPU 160.

On the basis of the navigation message, the phase of the PRN code, and the carrier frequency supplied from the synchronization holding unit 150, the CPU 160 calculates the position and the speed of each GPS satellite and calculates the position of the GPS module 100. Furthermore, the CPU 160 may correct the time information of the RTC 164 on the basis of the navigation message. In addition, the CPU 160 may be connected to a control terminal, an I/O terminal, an additional function terminal, and the like to perform other various control processing.

The RTC 164 measures the time by using the signal D1 having a predetermined frequency supplied from the XO 172. The time measured by the RTC 164 is appropriately corrected by the CPU 160.

The timer 168 clocks the time using the signal D4 supplied from the multiplier/frequency divider 176. The timer 168 is referred when a start timing of various controls by the CPU 160 is determined. For example, when a start timing of an operation of a PRN code generator of the synchronization holding unit 150 is determined on the basis of the phase of the PRN code acquired by the synchronization acquisition unit 140, the CPU 160 refers to the timer 168.

The memory 170 includes a random access memory (RAM), a read-only memory (ROM), and the like, and functions as a work space by the CPU 160, a storage unit of a program, a storage unit of the navigation message, and the like. In the memory 170, the RAM is used as a work area when the CPU 160 and the like performs various processing. Furthermore, the RAM is used to buffer various input data and to hold ephemeris and almanac which are orbit information of the GPS satellite obtained from the synchronization holding unit 150, intermediate data generated in the operation processing or operation result data. Furthermore, in the memory 170, a ROM is used as means for storing various programs, fixed data, and the like. Furthermore, in the memory 170, a nonvolatile memory may be used as means for storing the ephemeris and the almanac which are the orbit information of the GPS satellite, the position information of the measured result, an error amount of the TCXO 1, or the like while the power of the GPS module 100 is turned off.

Furthermore, each block except for the XO 172, the TCXO 174, the antenna 112, and the BPF 124 in the configuration of the GPS module 100 illustrated in FIG. 9 can be mounted on a single-chip integrated circuit.

In addition, the synchronization acquisition unit 140 uses a matched filter, for example, to perform synchronization acquisition of a spreading code at high speed. Specifically, the synchronization acquisition unit 140 may use a transversal filter as a matched filter. Alternatively, the synchronization acquisition unit 140 may use a digital matched filter using Fast Fourier Transform (FFT) as a matched filter. Such a digital matched filter may be realized as software to be executed by using a digital signal processor (DSP).

In a case where the present technology is applied to the GPS module 100 configured as described above with reference to FIGS. 3 to 8, a digital circuit 121, except for the antenna 112, the frequency converter 120, the XO 172, and an analog circuit of the TCXO 174, includes the plurality of chips, that is, the main chip 21 and the power supply chip 22 as described above. In this case, the CPU 160 corresponds to the operation controller 31 of the main chip 21, the RTC 164 corresponds to the RTC 34 of the main chip 21 and the RTC 43 of the power supply chip 22, and the memory 170 corresponds to the setting holding unit 33 and the main chip 21 and the setting holding unit 42 of the power supply chip 22. For example, an I/O terminal corresponds to the communication units 32 and 41. Accordingly, the effect similar to that of the present technology can be obtained by the GPS module 100. That is, in a case where the plurality of chips is included and the resolutions of the RTCs are different from each other, the RTCs can be synchronized with each other while high resolution is maintained, and the power consumption can be reduced.

The series of processing described above can be performed by hardware and software. In a case where the series of the processing is performed by the software, a program included in the software is installed from a network and recording media.

Although not shown, the recording media is configured of removable medium, in which the program is recorded and which is distributed to distribute the program to a user, separately provided from an apparatus body. The removable medium includes a magnetic disk (including flexible disk) and an optical disk (including CD-ROM and DVD). In addition, the removable medium includes a magnetooptical disk (including mini disc (MD)) and a semiconductor memory.

In this case, the program can be installed to a storage unit via an input/output interface by mounting the removable medium in a drive.

Furthermore, the program can be provided via a wired or wireless transmission media such as a local area network, the Internet, and digital satellite broadcasting. In that case, the program can be installed to the communication unit (for example, I/O) of each device.

In addition, the program can be installed in advance in the ROM or the storage unit (for example, memory 170) of each device.

Note that, the program performed by the computer may be a program in which processing is performed along the order described herein in a time series manner and a program in which the processing is performed in parallel or at a necessary timing when a call has been performed.

Note that the term of the system herein means an entire apparatus configured by a plurality of devices, blocks, units, and the like.

In addition, the embodiment of the present disclosure is not limited to the embodiment described above and can be variously changed without departing from the scope of the present disclosure.

Furthermore, the configuration described above as a single device (or processing unit) may be divided, and the divided parts may form a plurality of devices (or processing unit). Conversely, the configuration described above as a plurality of devices (or processing unit) may be collectively configured as a single device. Furthermore, a configuration other than the configuration described above may be added to the configuration of each device (or each processing unit). In addition, when the configuration and the operation as a whole system are substantially the same, a part of the configuration of a device (or processing unit) may be included in the configuration of the other device (or other processing unit). That is, the present technology is not limited to the above-mentioned embodiments, and various changes can be made without departing from the scope of the present technology.

Preferred embodiments of the present disclosure have been described in detail above with reference to the drawings. However, the present disclosure is not limited to the examples. It is obvious that a person who has normal knowledge in the technical field to which the present disclosure belongs can easily arrive at various variations and modifications in the scope of the technical ideas described in claims. It is understood that the variations and modifications naturally belong to the technical scope of the present disclosure.

Note that, the present technology can have the configuration below.

(1) A signal processing apparatus including:
a first chip which includes a first real time clock (RTC) for holding a time by a count operation in response to a clock signal and controls an operation; and
a second chip which includes a second RTC different from the first RTC and controls power supply, in which
the first chip includes an operation controller which synchronizes a time of the first RTC with a time of the second RTC.

(2) The signal processing apparatus according to (1), in which
the operation controller synchronizes the time of the second RTC with the first RTC at the time when power supply of the first chip is restored from a stop.

(3) The signal processing apparatus according to (2), in which
in a case where a resolution of the first RTC is higher than a resolution of the second RTC, the operation controller makes a memory hold time information that the first RTC is capable of holding as information regarding a difference between the time of the first RTC and the time of the second RTC before the power supply of the first chip is stopped, and makes the memory use the time information when the power supply of the first chip is restored from the stop.

(4) The signal processing apparatus according any one of (1) to (3), in which
in a case where a resolution of the first RTC is higher than a resolution of the second RTC, the operation controller makes a memory hold time information that the first RTC is capable of holding as information regarding a difference between the time of the first RTC and the time of the second RTC before the power supply of the first chip is stopped, and makes the memory use the time information when the power supply of the first chip is restored from the stop.

(5) A signal processing method for synchronizing a time of a first RTC with a time of a second RTC
by a signal processing apparatus including
a first chip which includes the first RTC for holding a time by a count operation in response to a clock signal and controls an operation and
a second chip which includes the second RTC different from the first RTC and controls power supply.

REFERENCE SIGNS LIST

11 Signal processing apparatus
21 Main chip
22 Power supply chip
31 Operation controller
32 Communication unit
33 Setting holding unit
34 RTC
34a Counter
41 Communication unit
42 Setting holding unit
43 RTC
43a Counter
44 Power supply holding unit
61 Nonvolatile memory
71 Register
81 Comparator
82 Alarm setting register
100 GPS system
120 Frequency converter
121 Digital circuit
160 CPU
RTC 164
170 Memory

The invention claimed is:

1. A signal processing apparatus, comprising:
a central processing unit (CPU) configured to:
read a first time data from a first chip, wherein
the first chip includes a first real time clock (RTC) configured to hold a time based on an execution of a count operation in response to a clock signal, and
the first chip is configured to control an operation;
store a future time data in a first register of the first chip and in a second register of a second chip, wherein the future time data is stored based on the read first time data;
stop a power supply of the second chip, based on the storage of the future time data, wherein the power supply is stopped such that a second RTC of the second chip, is reset, wherein the second RTC is different from the first RTC; and
synchronize the time of the first RTC with a time of the second RTC based on a comparison of the future time data with a current time data of the first RTC.

2. The signal processing apparatus according to claim 1, wherein
the CPU is further configured to restore the power supply of the second chip based on the comparison, and
the time of the second RTC is synchronized with the time of the first RTC after the restoration of the power supply of the second chip.

3. The signal processing apparatus according to claim 2, wherein a resolution of the first RTC is lower than a resolution of the second RTC, and
the CPU is further configured to:
read a second time data from the second RTC of the second chip, wherein the first time data is read before the stoppage of the power supply of the second chip;
store a plurality of least significant bits (LSB) of the read second time data in the second register, wherein the plurality of LSBs corresponds to a difference between the read first time data and the read second time data; and
load the plurality of LSBs from the second register, into a counter of the second RTC of the second chip, wherein the plurality of LSBs is loaded into the counter after the power supply of the second chip is restored.

4. A signal processing method, comprising:
reading a first time data from a first chip, wherein
the first chip includes a first real time clock (RTC) configured to hold a time based on an execution of a count operation in response to a clock signal, and the first chip is configured to control an operation;
storing a future time data in a first register of the first chip and in a second register of a second chip, wherein the future time data is stored based on the read first time data;
stopping a power supply of the second chip, based on the storage of the future time data, wherein the power supply is stopped such that a second RTC of the second chip, is reset, wherein the second RTC is different from the first RTC; and
synchronizing the time of the first RTC with a time of the second RTC based on a comparison of the future time data with a current time data of the first RTC.

5. The signal processing method according to claim 4, further comprising:
restoring the power supply of the second chip based on the comparison, wherein the time of the second RTC is synchronized with the time of the first RTC, after the restoration of the power supply of the second chip.

6. The signal processing method according to claim 5, further comprising:
reading a second time data from the second RTC of the second chip, wherein the first time data is read before the stoppage of the power supply of the second chip;
storing a plurality of least significant bits (LSB) of the read first time data in the second register, wherein the plurality of LSBs corresponds to a difference between the read first time data and the read second time data; and
loading the plurality of LSBs into a counter of the second RTC of the second chip, wherein the plurality of LSBs is loaded into the counter, after the power supply of the second chip is restored,
wherein the second RTC has a higher resolution than the first RTC.

* * * * *